June 26, 1962

J. G. OGLE, JR 3,040,503

POWER MOWER SAFETY SHIELD

Filed June 14, 1960

JOHN G. OGLE, JR.
INVENTOR

BY *Walter G. Finch*
ATTORNEY

United States Patent Office 3,040,503
Patented June 26, 1962

3,040,503
POWER MOWER SAFETY SHIELD
John G. Ogle, Jr., Box 671C, Route 4, Baltimore 21, Md.
Filed June 14, 1960, Ser. No. 35,932
2 Claims. (Cl. 56—25.4)

This invention relates generally to the class of harvesters, and more particularly it pertains to safety shields for lawn mowers.

Lawn mowers, especially of those of the horizontally spinning blade type, have caused injury to many operators. Present day power mowers have been known to throw pebbles and chopped steel wire pieces with lethal force. The operator is especially vulnerable because the mower must provide considerable ground clearance to the front and rear for fore and aft stroking over tall grass. Consequently, severe injury has been caused to the feet of the operator if the machine slips suddenly backward over his toes while on an inclined terrain.

It is, therefore, an object of this invention to provide an effective shield against cast objects which is readily attached to lawn mowers.

Another object of this invention is to provide a trailing toe-guard or safety shield which is self-adjusting to the terrain and is equally effective when the machine to which it is attached is stroked forwardly or backwardly.

Other objects of this invention are to provide a trailing toe-guard attachment for lawn mowers which is economical to manufacture, easy to install, and which is efficient and reliable in operational use.

Figure 1:
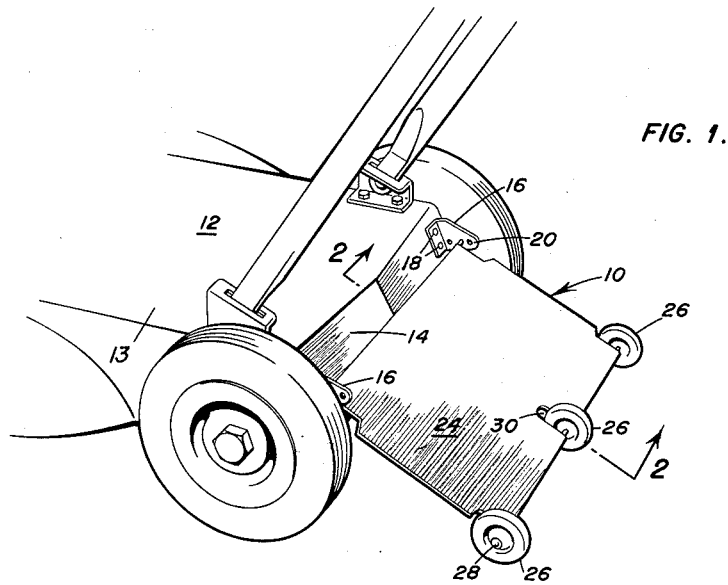
Figure 2:
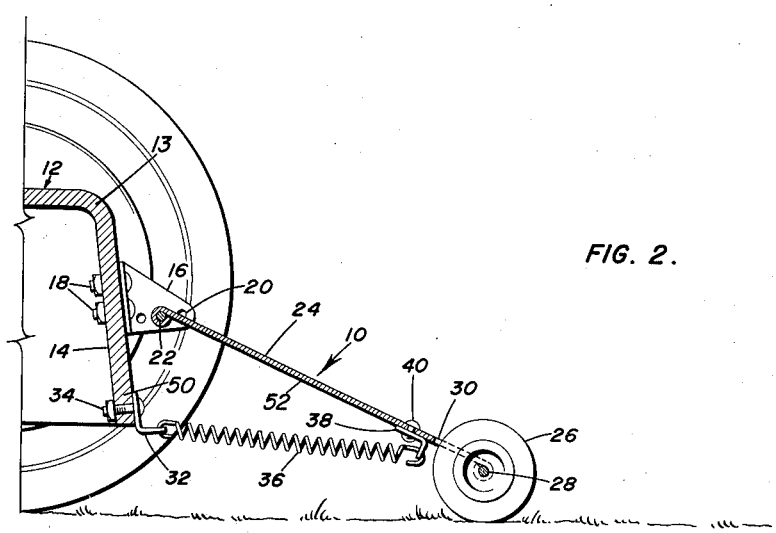

Other objects and attendant advantages of this invention will become more readily apparent and understood from the accompanying specification and single sheet of drawings in which:

FIG. 1 is a perspective view of a novel safety shield or trailing toe-guard device showing its attachment to a lawn mower; and FIG. 2 is an enlarged vertical section taken along the line 2—2 in FIG. 1.

Referring now to the details of the drawings, and particularly to FIG. 1, the safety shield or trailer toeguard device is indicated generally therein by reference numeral 10. This safety shield 10 consists generally of a rectangular shaped light metal apron 24 so dimensioned as to clear the wheels of a lawn mower 12.

The apron 24 is hinged to the rear wall 14 of the housing 13 of the lawn mower 12 by means of a pair of spaced hinge brackets 16 which are secured thereto by fasteners 18. A plurality of adjustment apertures 20 are provided in the hinge brackets 16 so that the pivot line of hinging can be arranged as close to the rear wall 14 as the contour thereof will permit.

A continuous hinge rod 22 is mounted between selected holes 20 of the pair of brackets 16. The apron 24 is secured intermediate the brackets 16 on this rod 22, and it is thus free to pivot therewith.

The free trailing end of the apron 24 is provided with one or more small diameter wheels 26. The wheels 26 are pivoted on a continuous axle rod 28 which is secured near the edge of the apron 24 which is notched at 30 for the center wheel 26.

To continuously urge the wheels 26 against the ground, there is provided a tension coiled spring 36 which extends between a pair of spaced clips 32 and 38. The clip 32 is secured by means of a fastener 34 to the lowermost portion 50 of the rear wall 14 of the housing 13. The clip 38 is secured by another fastener 40 to the unedrside 52 of the apron 24 close to the axle rod 28.

Sticks or stones or other impelled articles passing under the rear wall 14 of the housing 13 harmlessly strike the underside of the apron 24 of the safety shield 10.

Should the lawn mower 12 move backwards toward the feet of the operator, the rear edges of the apron 24 of the safety shield 10 and wheels 26 prevent the toes oft he operator from extending into the danger zone under the rear wall 14 thereof.

Obviously many modifications and variations of the present invention are possible in light of the above teachings. It is, therefore, to be understood that within the scope of the appended claims the invention may be practiced otherwise than as specifically described.

What is claimed is:

1. In combination, a power driven lawn mower having a housing with a substantially vertically arranged rear wall having a lower portion, a safety shield having one end thereof pivotally mounted at spaced points to the lower portion of said rear wall of said housing and extending outwardly and downwardly therefrom to stop articles impelled by said power driven lawn mower which pass beyond said housing, roller means secured to the opposite end of said safety shield at spaced points, and spring means connected to said opposite end of said safety shield and to said lower portion of said rear wall of said housing for biasing said safety shield into an operative position inwardly toward said rear wall of said housing and for holding said pivotally mounted safety shield in an inoperative position above and to the rear of said housing when said safety shield is raised beyond dead center.

2. A trailing toeguard for a power driven lawn mower having a housing with a substantially vertical arranged rear wall having a lower portion, comprising, a safety shield having one end thereof pivotally mounted at spaced points to the lower portion of said rear wall of said housing and extending outwardly and downwardly therefrom to stop articles impelled by said power driven lawn mower which pass beyond said housing, roller means secured to the opposite end of said safety shield at spaced points, and spring means connected to said opposite end of said safety shield and to said lower portion of said rear wall of said housing for biasing said safety shield into an operative position inwardly toward said rear wall of said housing and for holding said pivotally mounted safety shield in an inoperative position above and to the rear of said housing when said safety shield is raised beyond dead center.

References Cited in the file of this patent
UNITED STATES PATENTS

| | | |
|---|---|---|
| 2,448,074 | Bishop | Aug. 31, 1948 |
| 2,659,191 | Miller et al. | Nov. 17, 1953 |
| 2,730,374 | Rogers et al. | Jan. 10, 1956 |
| 2,743,565 | Dow | May 1, 1956 |
| 2,787,881 | McDaniel | Apr. 9, 1957 |
| 2,854,804 | Scott | Oct. 7, 1958 |
| 2,929,186 | Bundy | Mar. 22, 1960 |
| 2,973,613 | Hagedorn | Mar. 7, 1961 |